(12) United States Patent
Nakagawa et al.

(10) Patent No.: US 8,346,440 B2
(45) Date of Patent: Jan. 1, 2013

(54) OCCUPANT DETECTION SYSTEM AND METHOD OF CONTROLLING THE SYSTEM

(75) Inventors: Hajime Nakagawa, Nagoya (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 340 days.

(21) Appl. No.: 12/653,122

(22) Filed: Dec. 8, 2009

(65) Prior Publication Data

US 2010/0152975 A1 Jun. 17, 2010

(30) Foreign Application Priority Data

Dec. 11, 2008 (JP) ................................. 2008-316109
Oct. 26, 2009 (JP) ................................. 2009-245754

(51) Int. Cl.
*B60R 21/015* (2006.01)

(52) U.S. Cl. ......................... 701/45; 280/735

(58) Field of Classification Search .................... 701/45; 200/85 A; 324/686; 280/735; 340/665, 340/667, 666; 180/273; 382/104, 218
See application file for complete search history.

(56) References Cited

U.S. PATENT DOCUMENTS

| | | | |
|---|---|---|---|
| 6,629,445 B2* | 10/2003 | Yamanaka et al. | 73/1.13 |
| 7,216,895 B2* | 5/2007 | Hattori et al. | 280/735 |
| 7,401,532 B2 | 7/2008 | Wanami | |
| 2002/0053980 A1* | 5/2002 | Masuda et al. | 340/667 |
| 2004/0249536 A1* | 12/2004 | Hattori et al. | 701/45 |
| 2005/0275202 A1* | 12/2005 | Wato et al. | 280/735 |
| 2006/0164254 A1* | 7/2006 | Kamizono et al. | 340/667 |
| 2008/0121511 A1* | 5/2008 | Saitoh et al. | 200/85 A |
| 2008/0143508 A1 | 6/2008 | Saitoh | |
| 2008/0246316 A1* | 10/2008 | Carine et al. | 297/216.11 |
| 2010/0301880 A1* | 12/2010 | Stanley et al. | 324/686 |

FOREIGN PATENT DOCUMENTS

| | | |
|---|---|---|
| JP | 10-211860 | 8/1998 |
| JP | 11-271463 | 10/1999 |
| JP | 2000326818 | * 11/2000 |
| JP | 2005-233845 | 9/2005 |
| JP | 2006-281990 | 10/2006 |
| JP | 2006-321408 | 11/2006 |
| JP | 2008-151605 | 7/2008 |

* cited by examiner

*Primary Examiner* — Thomas G. Black
*Assistant Examiner* — Marthe Marc-Coleman
(74) *Attorney, Agent, or Firm* — Harness, Dickey & Pierce, PLC (57) ABSTRACT

A capacitance sensor outputs a signal indicating one of an occupant-seated state, a CRS-mounted state and a vacancy state. A load sensor is ON when a predetermined load applied to the load sensor through the seat, and is OFF when the predetermined load is not applied. A controller turns off both of an on-light indicating airbag inflation allowance and an off-light indicating airbag inflation prohibition, when the signal indicates the vacancy state, and when the load sensor is OFF. The controller turns on the off-light, when the signal indicates the vacancy state, and when the load sensor is ON.

18 Claims, 9 Drawing Sheets

| CAPACITANCE DETERMINATION | LOAD DETERMINATION | FINAL DETERMINATION | AIRBAG ON-LIGHT | AIRBAG OFF-LIGHT |
|---|---|---|---|---|
| ADULT (ON) | ON | ADULT (ON) | ON | OFF |
| ADULT (ON) | OFF | ADULT (ON) | ON | OFF |
| CRS (OFF) | ON | CRS (OFF) | OFF | ON |
| CRS (OFF) | OFF | CRS (OFF) | OFF | ON |
| VACANT | ON | CRS (OFF) | OFF | ON |
| VACANT | OFF | VACANT | OFF | OFF |

OCCUPANT DETECTION SYSTEM AND METHOD OF CONTROLLING THE SYSTEM

CROSS REFERENCE TO RELATED APPLICATION

This application is based on Japanese Patent Application No. 2008-316109 filed on Dec. 11, 2008 and Japanese Patent Application No. 2009-245754 filed on Oct. 26, 2009, the disclosures of which are incorporated herein by reference in their entirety.

BACKGROUND OF THE INVENTION

1. Field of the Invention

The present invention relates to an occupant detection system and a method of controlling the occupant detection system.

2. Description of Related Art

JP-A-11-271463 discloses an occupant detection system having a mat-shaped electrostatic sensor and an electronic control unit (ECU). When a weak electric field is generated between a vehicle chassis and a main electrode disposed in an occupant seat, the electrostatic sensor outputs a variation of the electric field as current or voltage.

The electrostatic sensor has a pair of electrodes. When the occupant seat is vacant, air is filled between the pair of electrodes. When a child restraint system (CRS) is mounted on the occupant seat, the CRS is located between the pair of electrodes. When an occupant is seated on the occupant seat, the occupant is located between the pair of electrodes.

Air has a relative permittivity of about 1. The CRS has a relative permittivity of about 2-5. A body of the occupant has a relative permittivity of about 50. Thus, the relative permittivity is different among air, the CRS and the occupant body. Therefore, a capacitance between the pair of electrodes of the electrostatic sensor is changed, when a situation of the occupant seat is changed.

The variation of the electric field can be output by the change of the capacitance as current or voltage. The ECU performs a determination relative to the situation based on the output current/voltage value. That is, the ECU determines the situation of the occupant seat to be in a vacancy state, CRS-mounted state or occupant-seated state.

Further, an airbag electronic control unit determines an airbag inflation to be allowable or not based on the situation determination. Specifically, when the occupant seat is vacant, or when the CRS is mounted on the occupant seat, the airbag inflation is prohibited. When the occupant is seated on the occupant seat, the airbag inflation is allowable.

When the airbag inflation is allowable, an airbag ON-light is on to indicate the allowable state. When the airbag inflation is prohibited, an airbag OFF-light is on to indicate the prohibited state.

When the occupant seat is vacant, both of the ON-light and the OFF-light may be required to be off, because nothing exists on the occupant seat.

However, the capacitance of the vacancy state is close to that of the CRS-mounted state. Even when a one-year-old child, for example, is seated on the CRS, the capacitance is close between the CRS-mounted state and the vacancy state. Therefore, it is difficult to distinguish the situation of the occupant seat to be in the vacancy state or the CRS-mounted state.

SUMMARY OF THE INVENTION

In view of the foregoing and other problems, it is an object of the present invention to provide an occupant detection system and a method of controlling the occupant detection system.

According to a first example of the present application, an occupant detection system includes a capacitance sensor, a load sensor, and a controller. The capacitance sensor has an electrode arranged in a seat, so as to output one of an occupant-seated signal indicating an occupant seated on the seat, a CRS-mounted signal indicating a child restraint system mounted on the seat, and a vacancy signal indicating the seat being vacant, based on a variation of weak electric field generated between the electrode and a vehicle ground. The load sensor is arranged in the seat. The load sensor is in an on-state when a predetermined load is applied to the load sensor through the seat. The load sensor is in an off-state, when the predetermined load is not applied to the load sensor. The controller controls an on-light indicating airbag inflation allowance for the seat, and an off-light indicating airbag inflation prohibition for the seat. The signals are output as current or voltage. The controller turns on the on-light, when the capacitance sensor outputs the occupant-seated signal, and when the load sensor is in the on-state or the off-state. The controller turns on the off-light, when the capacitance sensor outputs the CRS-mounted signal, and when the load sensor is in the on-state or the off-state. The controller turns on the off-light, when the capacitance sensor outputs the vacancy signal, and when the load sensor is in the on-state. The controller turns off both of the on-light and the off-light, when the capacitance sensor outputs the vacancy signal, and when the load sensor is in the off-state.

Accordingly, a situation of the seat can be accurately determined.

According to a second example of the present application, a method of controlling an occupant detection system includes a controlling of a capacitance sensor to output a first signal indicating one of an occupant-seated state in which an occupant is seated on a seat, a CRS-mounted state in which a child restraint system is mounted on the seat, and a vacancy state in which the seat is vacant. Further, the controlling method includes a controlling of a load sensor to output a second signal indicating one of an on-state in which a predetermined load is applied to the load sensor through the seat, and an off-state in which the predetermined load is not applied to the load sensor. Furthermore, the controlling method includes a controlling of an ON-light indicating airbag inflation allowance for the seat, and an OFF-light indicating airbag inflation prohibition for the seat, based on the first signal and the second signal.

Accordingly, the vacancy state and the CRS-mounted state can be accurately distinguished from each other.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
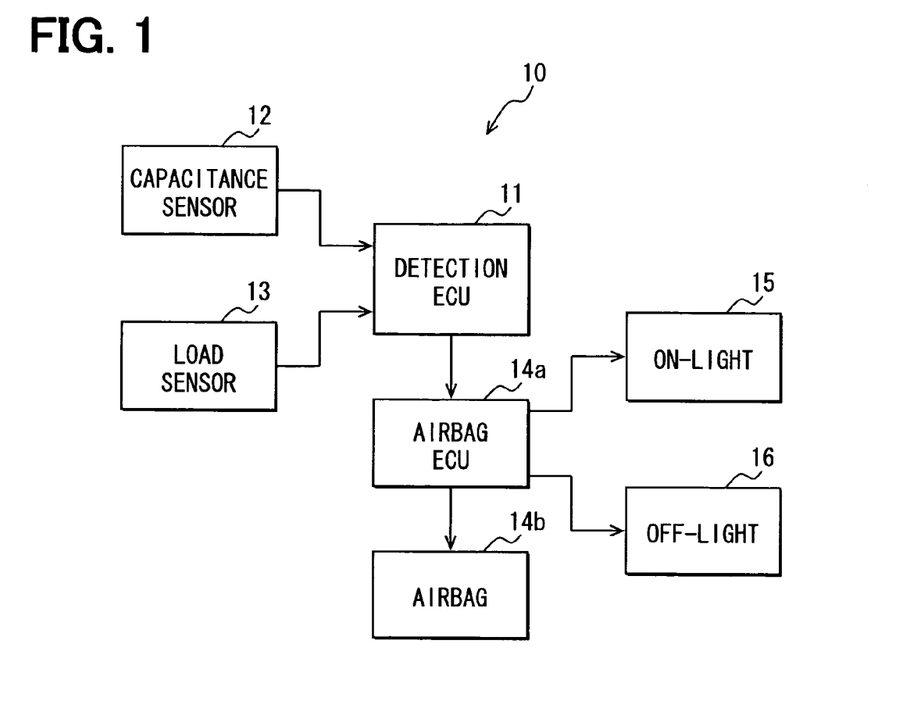
FIG. 1 is a block diagram illustrating an occupant detection system according to an embodiment.

As shown in FIG. 1, an occupant detection system 10 includes a detection electronic control unit (ECU) 11, a capacitance sensor 12, a load sensor 13, an airbag ECU 14a, an airbag 14b, an airbag ON-light 15, and an airbag OFF-light 16. The detection ECU 11 and the airbag ECU 14a may correspond to a controller.

Figure 2:
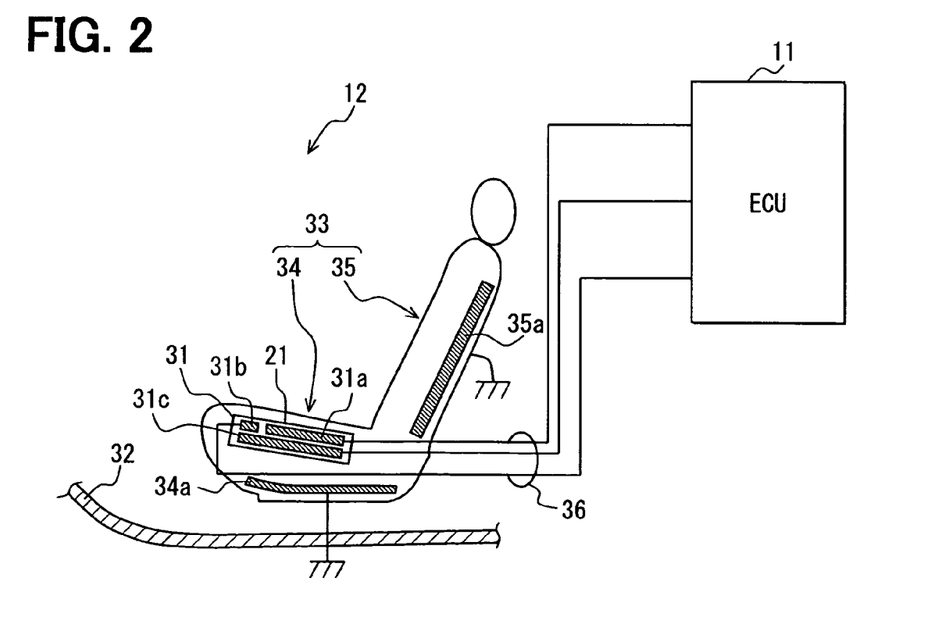
FIG. 2 is a schematic view illustrating a capacitance sensor of the occupant detection system.

The capacitance sensor 12 will be described with reference to FIG. 2. An occupant seat 33 includes a seat bottom 34 and a seat back 35. An occupant is seated on the seat bottom 34, and a back of the occupant reclines on the seat back 35. A bottom frame 34a is disposed in a lower part of the seat bottom 34, and is connected to a vehicle chassis 32 to be grounded. A back frame 35a is disposed in the seat back 35, and is connected to the vehicle chassis 32.

The capacitance sensor 12 includes a sensor part 31 disposed in the seat bottom 34. The sensor part 31 is sandwiched between an upper cover (not shown) and a cushion (not shown) of the seat bottom 34, and is located to oppose to the bottom frame 34a through an interval.

The sensor part 31 has a main electrode 31a, a sub-electrode 31b, and a guard electrode 31c. The main electrode 31a and the sub-electrode 31b are located adjacent to the upper cover, and the guard electrode 31c is located adjacent to the cushion.

The sub-electrode 31b is located adjacent to the main electrode 31a, but is distanced from the main electrode 31a. The guard electrode 31c is located to oppose to the main electrode 31a through an interval, and is positioned between the main electrode 31a and the bottom frame 34a. The sensor part 31 and the detection ECU 11 are connected through a connector wiring 36 such as a wire harness.

Figures 3, 4:
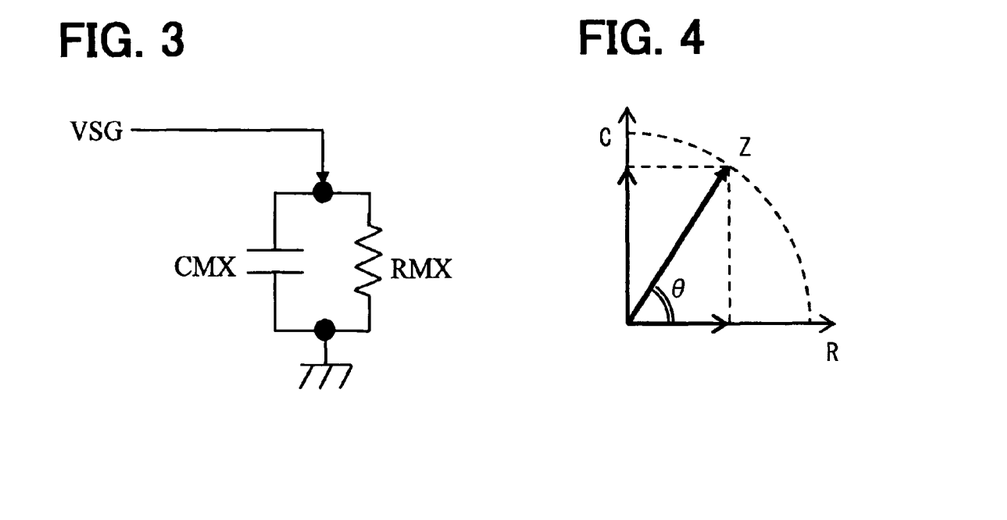
FIG. 3 is a schematic equivalent circuit diagram illustrating an object to be detected by the occupant detection system.
FIG. 4 is a schematic view illustrating an impedance of the object.

An object to be detected by the capacitance sensor 12 has an equivalent circuit shown in FIG. 3. For example, the capacitance sensor 12 detects human body or seat wetness. As shown in FIG. 3, the equivalent circuit has a resistor RMX and a capacitor CMX connected to parallel with each other.

The resistor RMX represents a real part R corresponding to a conductance, and the capacitor CMX represents an imaginary part C corresponding to a susceptance. Therefore, a capacitance of the object is detected by detecting an impedance Z having the real part R and the imaginary part C shown in FIG. 4.

Figure 5A:
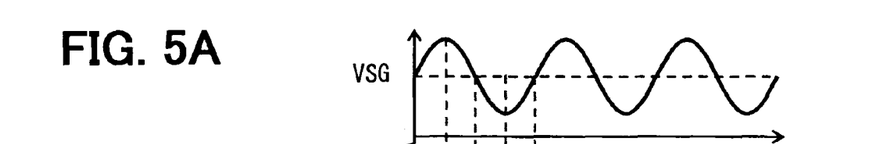
FIG. 5A is a signal waveform applied to the object.

When sine wave VSG shown in FIG. 5A is applied to the object, potential difference is generated to a current-detecting resistor (not shown) of the detection ECU 11 in accordance with the impedance Z of the object.

Figure 5B:
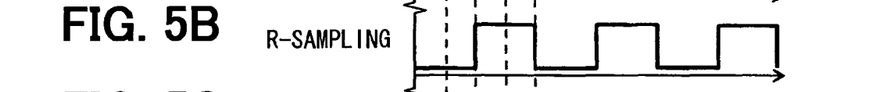
FIG. 5B is a signal waveform for sampling a real part of the impedance.

In a case that the impedance Z has only the real part R, the potential difference does not have a phase advance θ relative to the sine wave VSG. When the potential difference is sampled by a sampling timing shown in FIG. 5B, an output signal shown in FIG. 5D is obtained.

Figure 5C:
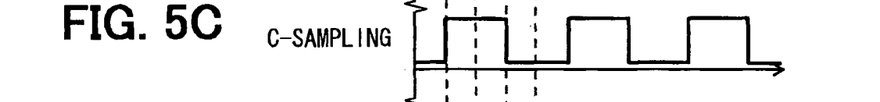
FIG. 5C is a signal waveform for sampling an imaginary part of the impedance.
Figure 5D:
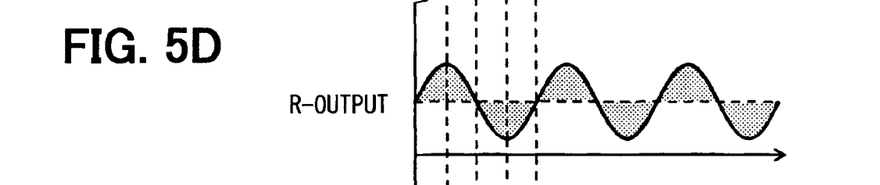
FIG. 5D is an output signal of the real part.

FIG. 5D shows the real part R changed from current to voltage, when the real part R is relatively large, and when the imaginary part C is approximately zero. The sampling timing of FIG. 5B has the same phase as the sine wave VSG, and the output signal shown in FIG. 5D is output based on only the real part R.

In a case that the impedance Z has only the imaginary part C, the potential difference has a phase advance θ relative to the sine wave VSG. When the potential difference is sampled by a sampling timing shown in FIG. 5C, an output signal shown in FIG. 5E is obtained.

Figure 5E:
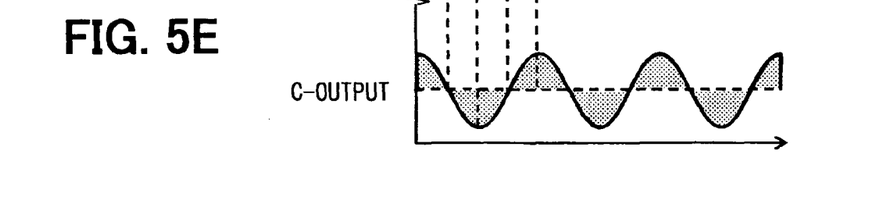
FIG. 5E is an output signal of the imaginary part.

FIG. 5E shows the imaginary part C changed from current to voltage, when the real part R is approximately zero, and when the imaginary part C is relatively large. The sampling timing of FIG. 5C has the phase advance of 90° relative to the sine wave VSG, and the output signal shown in FIG. 5E is output based on only the imaginary part C.

Because an actual object always has both of the real part R and the imaginary part C, the impedance Z having the phase θ is measured. Determination to be described below is performed based on the impedance Z.

Thus, the detection ECU 11 measures capacitance based on an electric line of force generated from the sensor part 31. That is, current flowing through the current-detecting resistor is converted to voltage based on a supply signal from the sine wave VSG.

When the detection ECU 11 selects the main electrode 31a and the guard electrode 31c, the determination is performed by the capacitance between the main electrode 31a and a ground GND. When the detection ECU 11 selects the sub-electrode 31b and the guard electrode 31c, the determination is performed by the capacitance between the sub-electrode 31b and the ground GND.

The detection ECU 11 measures the impedance Z of the object by using the capacitance sensor 12, and determines a state of the occupant seat 33 based on the impedance Z among a vacancy state, CRS-mounted state, or adult-seated state.

Figure 6:
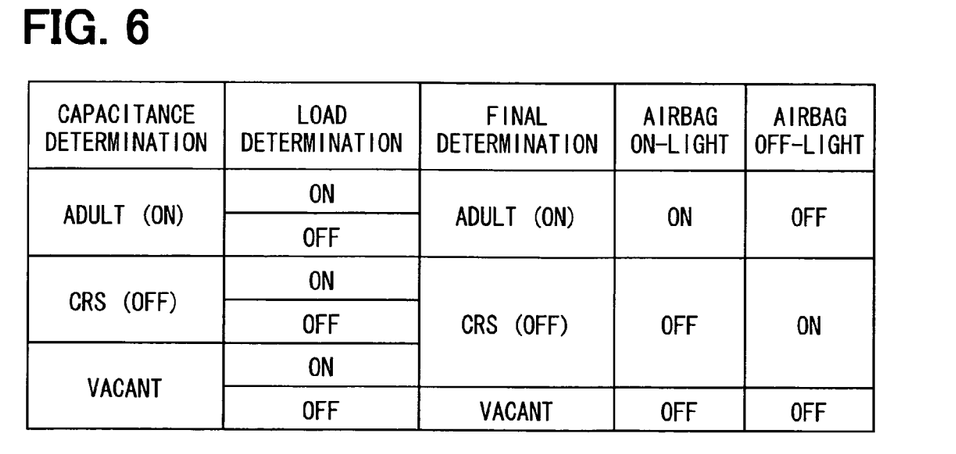
FIG. 6 is a diagram illustrating determination logic of the occupant detection system.

As shown in FIG. 6, in a capacitance determination based on the capacitance sensor 12, the adult-seated state is determined to be ON. Further, the CRS-mounted state is determined to be OFF, and the vacancy state is determined to be VACANT.

The load sensor 13 will be described with reference to FIG. 7.

The load sensor 13 includes a sensor switch 41 and a resistor 42. The switch 41 may be a known membrane switch, for example. The switch and the resistor 42 are connected in series between the detection ECU 11 and the ground. The switch 41 is arranged on a back side of the upper cover of the seat bottom 34. When an occupant is seated on the seat bottom 34, or when the CRS is mounted on the seat bottom 34, the switch 41 is ON by a load of the occupant or CRS.

When the occupant nor the CRS are not on the seat bottom 34, that is when nothing is on the seat bottom 34, the switch 41 is OFF. When the occupant or the CRS is on the seat bottom 34, the switch 41 is ON. A signal of ON or OFF is output into the detection ECU 11. As shown in FIG. 6, in a load determination based on the load sensor 13, an ON-signal is output when the switch 41 is ON, and an OFF-signal is output when the switch 41 is OFF.

The detection ECU 11 performs a final determination based on the capacitance determination and the load determination. The airbag ECU 14a controls the ON-light 15 and the OFF-light 16 based on the final determination.

When the capacitance determination is ON indicating the adult-seated state, and when the load determination is ON or OFF, the final determination is ON indicating the adult-seated state, and the airbag ECU 14a turns on the ON-light 15.

When the capacitance determination is OFF indicating the CRS-mounted state, and when the load determination is ON or OFF, the final determination is OFF indicating the CRS-mounted state, and the airbag ECU 14a turns on the OFF-light 16.

When the capacitance determination is VACANT indicating the vacancy state, and when the load determination is ON, the final determination is OFF indicating the CRS-mounted state, and the airbag ECU 14a turns on the OFF-light 16.

In contrast, when the capacitance determination is VACANT indicating the vacancy state, and when the load determination is OFF, the final determination is VACANT indicating the vacancy state, and the airbag ECU 14a turns off both of the ON-light 15 and the OFF-light 16.

In a case that the CRS is mounted on the seat bottom 34, when the capacitance is quite small, the capacitance sensor 12 may erroneously determine the seat 33 to be vacant. However, in this case, the load sensor 13 outputs the ON-signal, because a load of the CRS is detected. As a result, the detection ECU 11 determines the seat bottom 34 to have the CRS thereon, such that the final determination is OFF indicating the CRS-mounted state. Thus, the airbag ECU 14a turns on the OFF-light 16.

While the ON-light 15 is on, if the vehicle has a collision, the airbag 14b is inflated by the airbag ECU 14a. While the OFF-light 16 is on, even if the vehicle has a collision, the airbag 14b is not inflated. While both of the ON-light 15 and the OFF-light 16 are off, even if the vehicle has a collision, the airbag 14b is not inflated.

According to the embodiment, the occupant detection system includes the capacitance sensor 12 to output current or voltage based on a disturbance of a weak electric field generated between an electrode disposed in the occupant seat 33 and a ground. The disturbance is different among an occupant-seated state, a CRS-mounted state, and a vacancy state.

Further, the occupant detection system includes the load sensor 13 arranged in the occupant seat 33. When a predetermined load is applied to the load sensor 13 through the occupant seat 33, the load sensor 13 is in on state so as to output current or voltage. When the predetermined load is not applied to the load sensor 13, the load sensor 13 is in off state.

The occupant detection system includes the detection ECU 11 and the airbag ECU 14a so as to control the airbag ON-light 15 indicating an inflation allowable state of the airbag 14b, and the airbag OFF-light 16 indicating an inflation prohibited state of the airbag 14b.

When the capacitance sensor 12 outputs an occupant-seated state signal, and when the load sensor 13 is in on state or off state, the ON-light 15 is turned on. When the capacitance sensor 12 outputs an CRS-mounted state signal, and when the load sensor 13 is in on state or off state, the OFF-light 16 is turned on. When the capacitance sensor 12 outputs a vacancy state signal, and when the load sensor 13 is in on state, the OFF-light 16 is turned on. When the capacitance sensor 12 outputs the vacancy state signal, and when the load sensor 13 is in off state, both of the ON-light 15 and the OFF-light 16 are turned off.

In a case that the CRS is mounted, on the occupant seat 33, the capacitance sensor 12 erroneously may output the vacancy state signal, because the capacitance is so small. However, in this case, the load sensor 13 is in on state by detecting the load of the CRS. Therefore, the detection ECU 11 determines the occupant seat 33 to be in the CRS-mounted state, and the airbag ECU 14a turns on the airbag OFF-light 16.

When the occupant seat 33 is vacant, the capacitance sensor 12 outputs the vacancy state signal, and the load sensor 13 is in off state. Therefore, the detection ECU 11 determines the occupant seat to be vacant, and the airbag ECU 14a turns off both of the ON-light 15 and the OFF-light 16.

Thus, the vacancy state and the CRS-mounted state can be accurately distinguished from each other. Therefore, when the seat 33 is vacant, both of the ON-light 15 and the OFF-light 16 are turned off.

Figure 7:
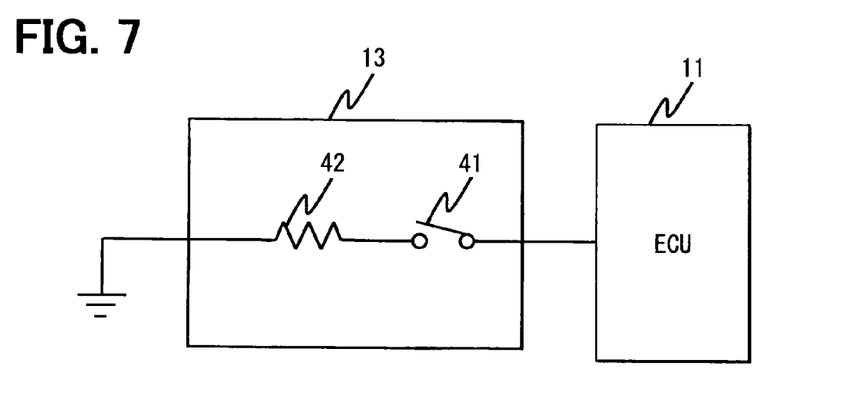
FIG. 7 is a schematic diagram illustrating a load sensor of the occupant detection system.

The load sensor 13 has a circuit shown in FIG. 7. Alternatively, the load sensor 13 may be another load sensor 13' having a circuit shown in FIG. 11A or FIG. 11B.

Figure 8:
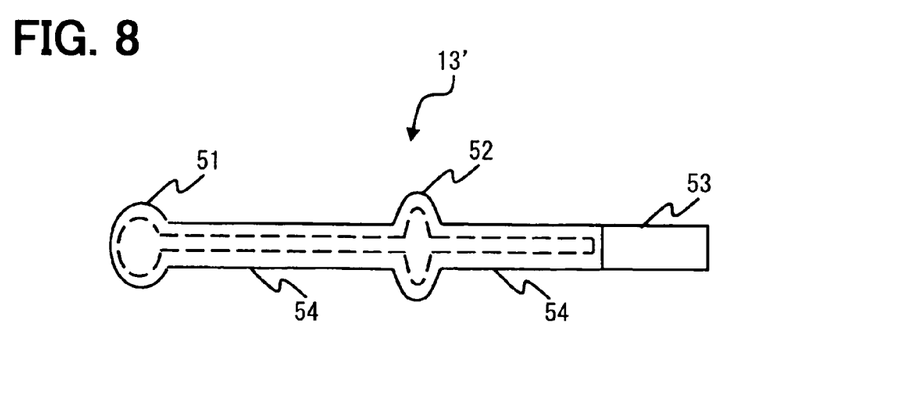
FIG. 8 is a schematic plan view illustrating another load sensor of the occupant detection system.

As shown in FIG. 8, the load sensor 13' includes a first sensor cell 51, a second sensor, cell 52, a connector 53, and a conductive part 54 electrically connecting the sensor cell 51, 52 and the connector 53. The sensor cell 51, 52 works as a conducting switch to conduct when a load is applied to the sensor cell 51, 52 by an occupant or object. The sensor cells 51, 52 are connected by the conductive part 54, and the connector 53 is connected to an end of the conductive part 54 opposite from the first sensor cell 51. The connector 53 is connected to the detection ECU 11.

Figure 9:
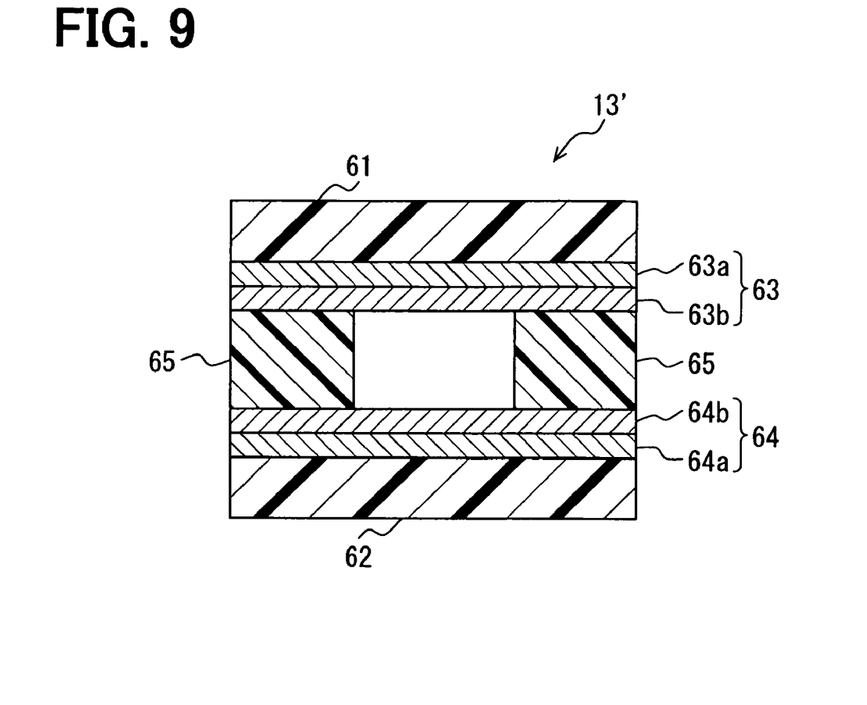
FIG. 9 is an enlarged cross-sectional view illustrating the another load sensor.

As shown in FIG. 9, a cross-section of the load sensor 13' is constructed by a first film 61, a second film 62, a first electrode 63, a second electrode 64 and a spacer 65. A basic construction is common between the sensor cell 51, 52 and the conductive part 54, but a specific difference between the sensor cell 51, 52 and the conductive part 54 will be described below.

The first film 61 is made of polyethylene naphthalate (PEN) resin having a thin shape. The first film 61 defines an outer form of the sensor cell 51, 52 and the conductive part 54, and has a linear shape as a whole. Each of the end-located sensor cell 51 and the center-located sensor cell 52 has an approximately circle shape made of the first film 61. The conductive part 54 has a linear shape, and a width of the linear shape is smaller than a diameter of the circle shape. A base end of the first film 61 is connected to the connector 53.

The second film 62 is made of the same material as the first film 61, and has the same shape as the first film 61. The second film 62 is located to oppose to the first film 61. A base end of the second film 62 is connected to the connector 53, similarly to the first film 61.

The first electrode 63 is arranged on an inner face of the first film 61, as shown in FIG. 9, and has a silver layer 63a and a carbon layer 63b. The silver layer 63a is bonded to the inner face of the first film 61, and the carbon layer 63b covers a surface of the silver layer 63a.

The second electrode 64 is arranged on an inner face of the second film 62, as shown in FIG. 9, and has a silver layer 64a and a carbon layer 64b. The silver layer 64a is bonded to the inner face of the second film 62, and the carbon layer 64b covers a surface of the silver layer 64a.

The carbon layer 64b of the second electrode 64 is distanced from the first electrode 63. That is, the first electrode 63 and the second electrode 64 are located to oppose to and be separated from each other, in the sensor cell 51, 52.

The spacer 65 is disposed between the carbon layers 63b, 64b. An outer shape of the spacer 65 is the same as the film 61, 62. As shown in a broken line of FIG. 8, a hollow extending in a longitudinal direction of the conductive part 54 is defined in a center part of the spacer 65. A width of the hollow of the sensor cell 51, 52 is larger than that of the conductive part 54. The spacer 65 is made of polyethylene terephthalate (PET) resin having a thin shape.

As shown in FIG. 9, a space is defined among the first electrode 63, the second electrode 64, and the spacer 65. When load is applied to the space in an up-and-down direction of FIG. 9, the first film 61, the second film 62, the first electrode 63 and the second electrode 64 have distorted deformations. Thus, the electrodes 63, 64 are electrically connected, because the electrodes 63, 64 contact with each other. That is, the sensor cell 51, 52 works as a conducting switch to electrically connect the electrodes 63, 64, when a load is applied.

Figure 10:
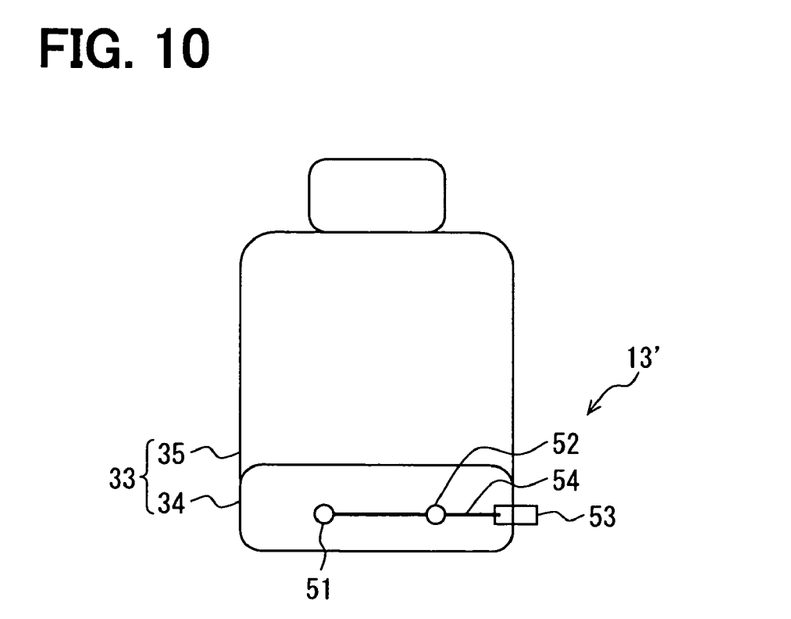
FIG. 10 is a front view illustrating an occupant seat having the another load sensor.

As shown in FIG. 10, the load sensor 13' is arranged in a manner that the sensor cells 51, 52 are located symmetric with respect to a center line of the seat 33. The load sensor 13' is located between the cushion and the upper cover of the seat bottom 34 of the seat 33.

Figure 11A:
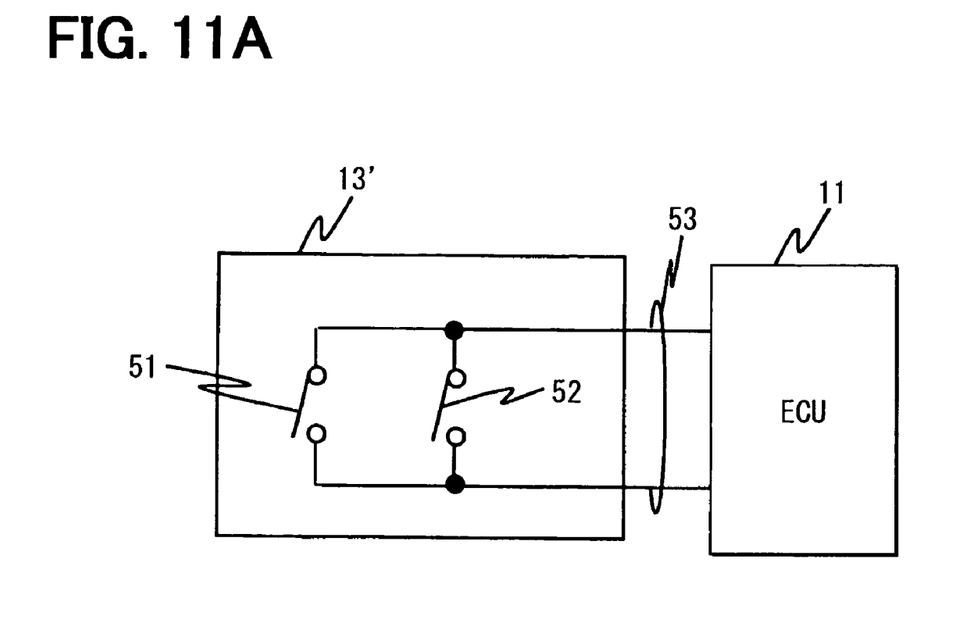
FIG. 11A is a first example circuit diagram illustrating the another load sensor.

When the load sensor 13' has a circuit shown in FIG. 11A, the end-located sensor cell 51 and the center-located sensor cell 52 are connected in parallel to the detection ECU 11 through the connector 53. When at least one of the sensor cells 51, 52 has conducting, the detection ECU 11 detects the load.

Figure 11B:
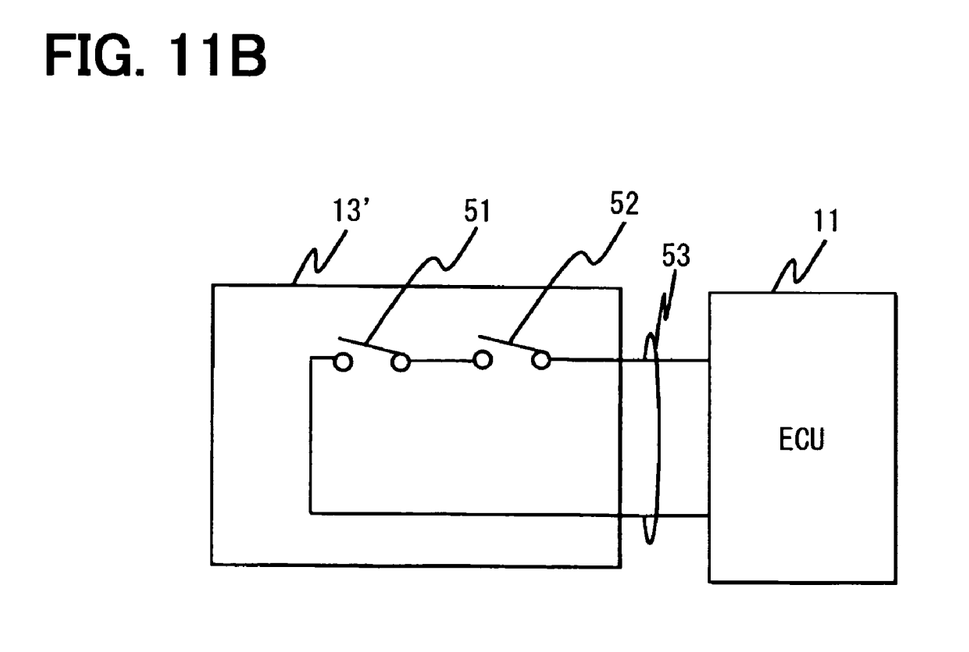
FIG. 11B is a second example circuit diagram illustrating the another load sensor.

When the load sensor 13' has a circuit shown in FIG. 11B, the end-located sensor cell 51 and the center-located sensor cell 52 are connected in series with the detection ECU 11. When both of the sensor cells 51, 52 have conduction, the detection ECU 11 detects the load.

When the load sensor 13' detects the occupant-seated state or the CRS-mounted state of the seat 33, a seatbelt state is detected and output to the detection ECU 11. The detection ECU 11 lights or blinks a seatbelt warning (not shown), if the seatbelt is not used for the occupant or the CRS.

The films 61, 62 of the load sensor 13' have liner shape. When plural films 61, 62 are cut in a large base material, patterning is performed in a state that the films 61, 62 are arranged in parallel with each other. Thus, yield from the base material can be better, because waste of the base material is reduced. Therefore, the producible number of the films 61, 62 from a single base material can be increased, such that cost of producing the load sensor 13' can be reduced.

The load sensor 13' has the electrodes 63, 64 to contact with each other when a load is applied. The electrodes 63, 64 are arranged to oppose to and be separated from each other between the films 61, 62. Thus, a construction of the load sensor 13' can be simple.

When a sensor using a strain gauge is used as the load sensor 13, detection accuracy of load can be improved. Thus, final determination accuracy of the detection ECU 11 can be improved.

Figure 12:
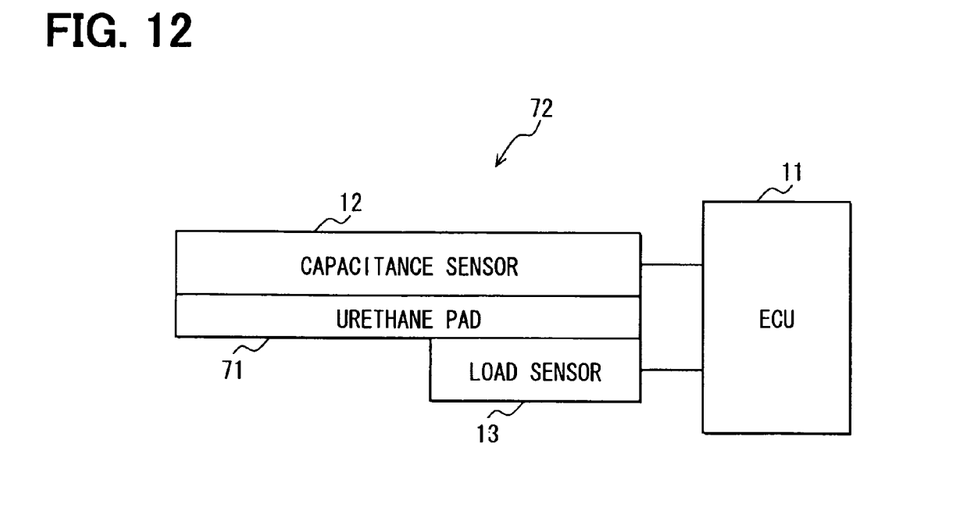
FIG. 12 is a schematic diagram view illustrating a first example integration of the capacitance sensor and the load sensor.

As shown in FIG. 12, the capacitance sensor 12 and the load sensor 13, 13' are mounted to faces of a board-shaped urethane pad 71 opposite from each other. Thus, the capacitance sensor 12 and the load sensor 13, 13' are integrated with each other as a single sensor device 72. The sensor device 72 is connected to the detection ECU 11. In this case, a size of the sensor device can be small, and the sensor device can be easily mounted in the seat 33.

Figure 13:
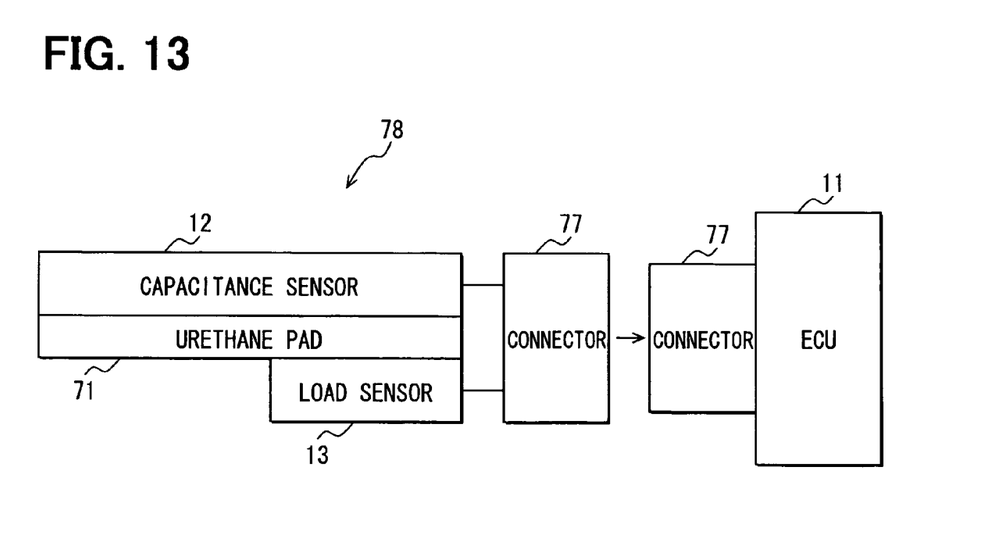
FIG. 13 is a schematic diagram view illustrating a second example integration of the capacitance sensor and the load sensor.

As shown in FIG. 13, the capacitance sensor 12 and the load sensor 13, 13' are mounted to faces of a board-shaped urethane pad 71 opposite from each other. Thus, the capacitance sensor 12 and the load sensor 13, 13' are integrated with each other as a single sensor device 78. Further, the sensor device 78 is connected to the detection ECU 11 through a connector 77. In this case, a size of the sensor device can be small, and the sensor device can be easily mounted in the seat 33.

Figure 14:
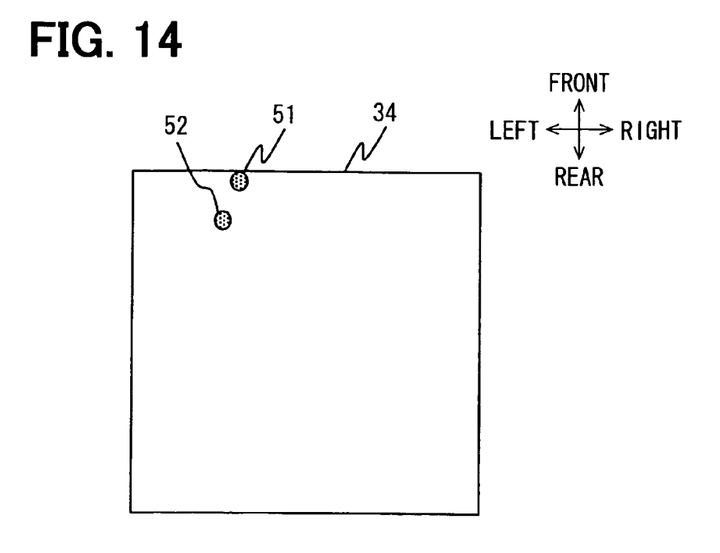
FIG. 14 is a schematic plan view illustrating positions of senor cells of the load sensor.

As shown in FIG. 14, the sensor cells 51, 52 of the load sensor 13' are located at predetermined positions of the seat bottom 34. In this case, the load sensor 13' has an electric circuit shown in FIG. 11A. When one of the sensor cells 51, 52 is electrically conducted, the detection ECU 11 obtains detection signal.

In the United States, for example, the mounting of the CRS to the seat bottom 34 is defined in a law Appendix A of FMVSS208. Nineteen kinds of CRS are defined in the law. Further, thirty-seven configurations are defined in the law as for the mounting of the CRS. In the thirty-seven configurations, the CRS is arranged in a forward-looking direction or a backward-looking direction, or the direction of the CRS is fixed to the forward-looking direction or the backward-looking direction. A contact area between the CRS and the seat bottom 34 is different in the thirty-seven configurations. Not only a case in which only the CRS is mounted to the seat bottom 34, but also a case in which the one-year-old child is seated in the CRS are defined for the mounting of the CRS.

Figure 15A:
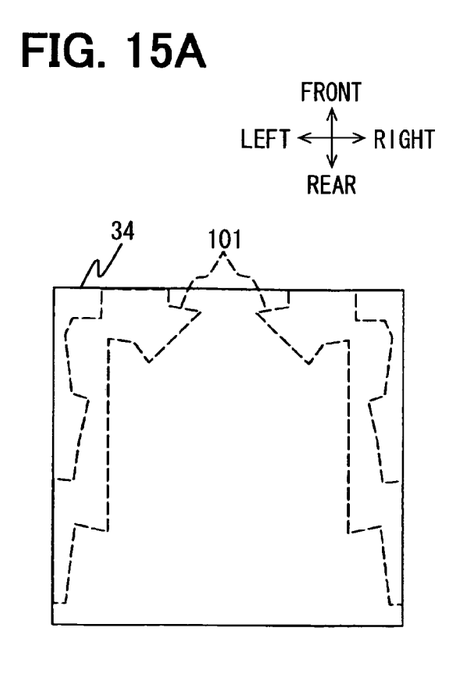
FIG. 15A is a schematic plan view illustrating a first contact area between an occupant seat and a child restraint system.

A broken line of FIG. 15A shows a contact area 101 between the seat bottom 34 and the CRS. A front part of the contact area 101 extends outward from an approximately center position in a left-right direction so as to define an elongated band shape. Further, the contact area 101 extends rearward from the front part in a front-rear direction so as to define an elongated meandering shape.

Figure 15B:
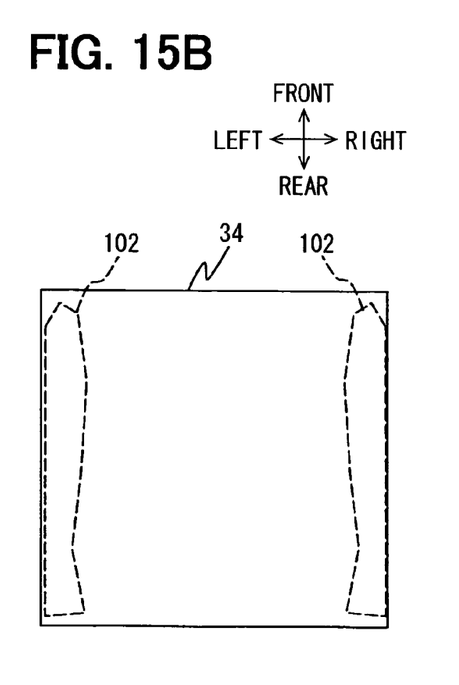
FIG. 15B is a schematic plan view illustrating a second contact area between the occupant seat and another child restraint system.

A broken line of FIG. 15B shows another contact area 102 between the seat bottom 34 and another CRS. The contact area 102 extends rearward from a front position so as to define an elongated shape on left and right sides of the seat bottom 34.

Figure 16A:
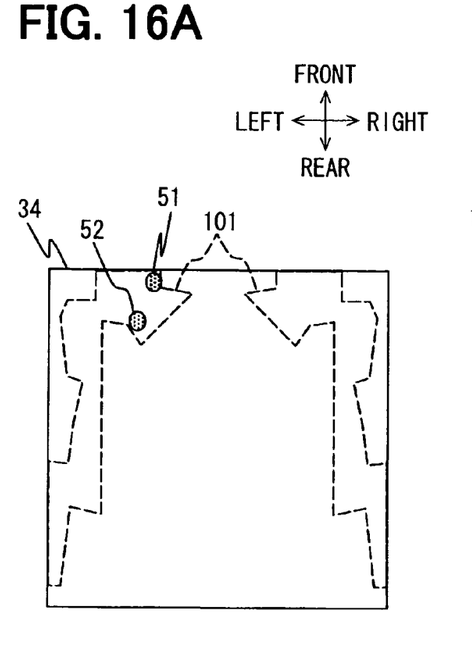
FIG. 16A is a schematic plan view illustrating position relationship between the first contact area and the sensor cells.
Figure 16B:
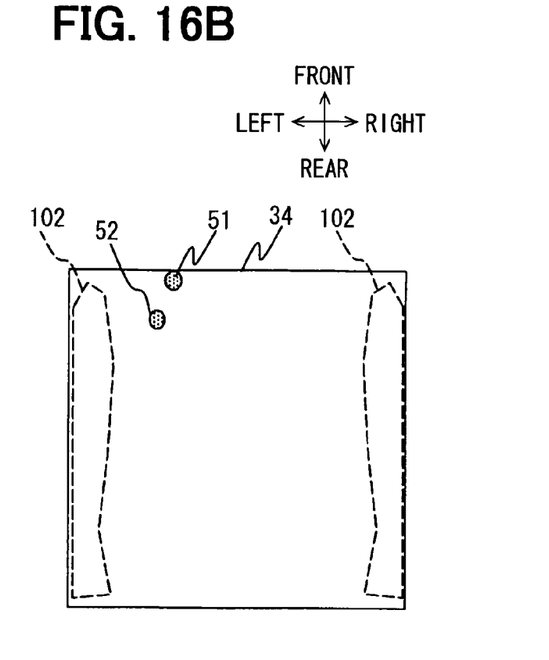
FIG. 16B is a schematic plan view illustrating position relationship between the second contact area and the sensor cells.

In a case that shapes of the contact area 101, 102 are different from each other, when the sensor cells 51, 52 have positions shown in FIG. 16A, the CRS can be detected, because the sensor cells 51, 52 are located inside of the contact area 101. However, when the sensor cells 51, 52 have positions shown in FIG. 16B, the CRS cannot be detected, because the sensor cells 51, 52 are located outside of the contact area 102. About 70% of the thirty-seven configurations have the contact area shown 101 in FIG. 16A.

When the sensor cells 51, 52 are positioned at the predetermined positions in the contact area 101 of FIG. 16A, about 70% of the thirty-seven CRS-mounted configurations can be detected.

Figure 17:
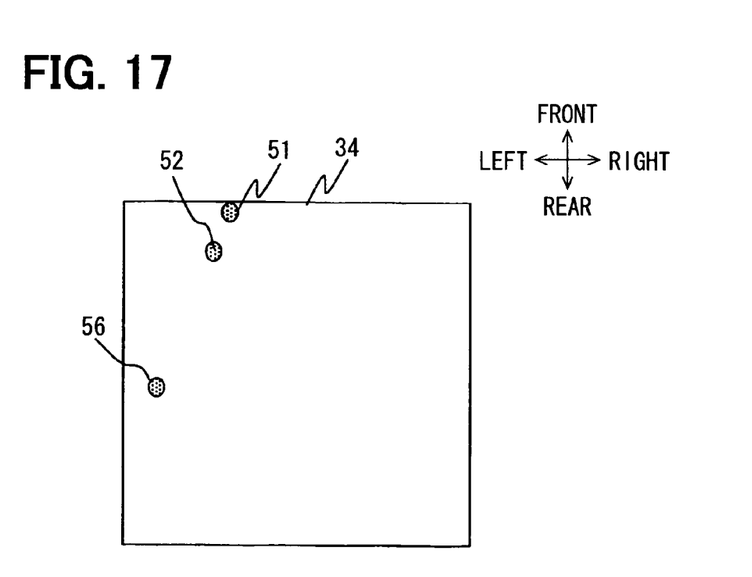
FIG. 17 is a schematic plan view illustrating positions of three senor cells of the load sensor.
Figure 18:
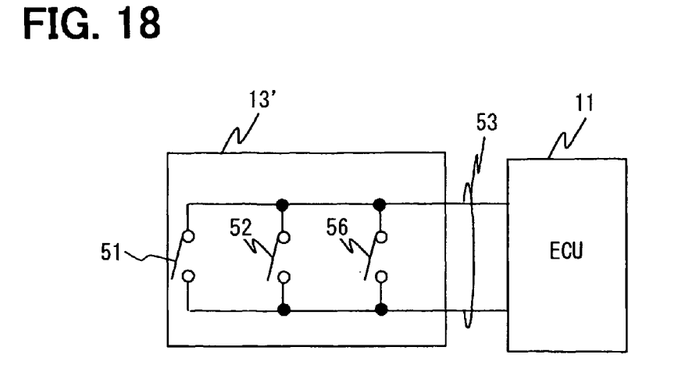
FIG. 18 is a circuit diagram illustrating the load sensor having the three sensor cells.

As shown in FIG. 17, the load sensor 13' further includes another sensor cell 56 other than the sensor cells 51, 52, and the sensor cell 56 is disposed at a predetermined position of the seat bottom 34. In this case, the load sensor 13' has an electric circuit shown in FIG. 18. The sensor cells 51, 52, 56 are connected parallel to the detection ECU 11. When at least one of the sensor cells 51, 52, 56 is electrically conducted, the detection ECU 11 obtains detection signal.

Figure 19A:
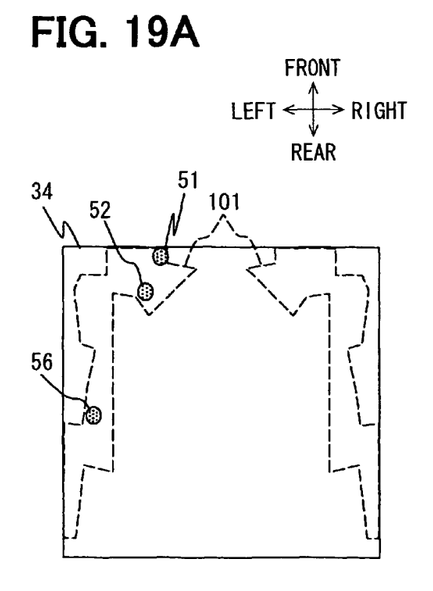
FIG. 19A is a schematic plan view illustrating position relationship between the first contact area and the three sensor cells.
Figure 19B:
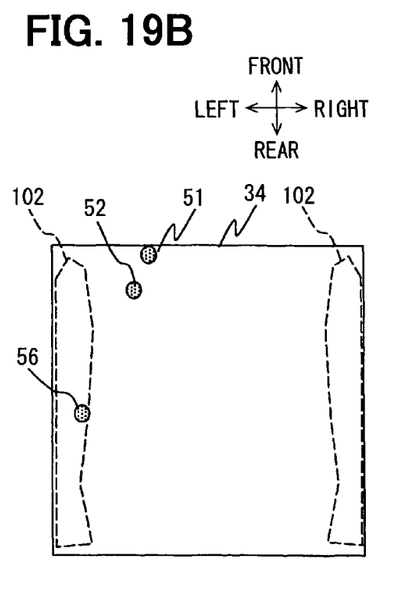
FIG. 19B is a schematic plan view illustrating position relationship between the second contact area and the three sensor cells.

As shown in FIGS. 19A and 19B, at least one of the sensor cells 51, 52, 56 is located in the contact area 101, 102 on the seat bottom 34, even when the shapes of the contact area 101, 102 are different between FIG. 19A and FIG. 19B. That is, the sensor cells 51, 52, 56 are located at the predetermined positions so as to detect the CRS relative to all of the thirty-seven CRS-mounted configurations.

Thus, because the CRS-mounted state can be properly detected for all of the thirty-seven configurations, the vacancy state and the CRS-mounted state can be properly determined and distinguished from each other. Therefore, both of the ON-light 15 and the OFF-light 16 can be turned off in the vacancy state.

Such changes and modifications are to be understood as being within the scope of the present invention as defined by the appended claims.

What is claimed is:

1. An occupant detection system comprising:
   a capacitance sensor to output a current/voltage signal based on a variation of weak electric field generated between a ground and an electrode arranged in a seat, the signal being one of
      an occupant-seated signal indicating an occupant seated on the seat,
      a CRS-mounted signal indicating a child restraint system mounted on the seat, and
      a vacancy signal indicating the seat being vacant;
   a load sensor arranged in the seat, the load sensor being ON when a predetermined load is applied to the load sensor through the seat, the load sensor being OFF when the predetermined load is not applied; and
   a controller to control an on-light indicating airbag inflation allowance for the seat, and an off-light indicating airbag inflation prohibition for the seat, wherein
   the controller turns on the off-light, when the vacancy signal is output, and when the load sensor is ON, and
   the controller turns off both of the on-light and the off-light, when the vacancy signal is output, and when the load sensor is OFF.

2. The occupant detection system according to claim 1, wherein
   the load sensor includes
      a pair of films, and
      a pair of sensor electrodes arranged between the pair of films, wherein
   the pair of sensor electrodes oppose to each other to be distanced from each other, and
   the pair of sensor electrodes are configured to be in contact with each other, when a load is applied to the load sensor.

3. The occupant detection system according to claim 1, wherein
   the load sensor has a switch to determine the predetermined load to be applied or not, and
   the switch is arranged to be located in a contact area between the seat and the child restraint system, when the child restraint system is mounted on the seat.

4. The occupant detection system according to claim 1, wherein
   the load sensor has a plurality of switches to determine the predetermined load to be applied or not,
   the child restraint system is one of a plurality of child restraint systems, such that a plurality of contact areas are defined between the seat and the child restraint system to correspond to the plurality of child restraint systems, and
   the plurality of switches is arranged in a manner that at least one of the plurality of switches is located in the contact area relative to all of the plurality of child restraint systems.

5. The occupant detection system according to claim 1, further comprising:
   an urethane pad having a first face and a second face opposite from each other, wherein
   the capacitance sensor is arranged on the first face of the urethane pad,
   the load sensor is arranged on the second face of the urethane pad, and
   the urethane pad integrates the capacitance sensor and the load sensor.

6. The occupant detection system according to claim 1, further comprising:
   an urethane pad having a first face and a second face opposite from each other; and
   a connector connected to the capacitance sensor and the load sensor, wherein
   the capacitance sensor is arranged on the first face of the urethane pad,
   the load sensor is arranged on the second face of the urethane pad, and
   the urethane pad integrates the capacitance sensor and the load sensor.

7. The occupant detection system according to claim 1, wherein
   the controller turns on the on-light, when the occupant-seated signal is output, and when the load sensor is ON or OFF, and
   the controller turns on the off-light, when the CRS-mounted signal is output, and when the load sensor is ON or OFF.

8. The occupant detection system according to claim 1, wherein the load sensor includes a first sensor cell, a second sensor cell, a connector, and a conductive part electrically connecting the first and second sensor cells and the connector, the connector is connected to an end of the conductive part opposite the first sensor cell.

9. The occupant detection system according to claim 8, wherein the first and second sensor cells are generally circular in shape, and the conductive part is generally linear in shape having a width dimension less than a diameter dimension of the generally circular shaped first and second sensor cells.

10. The occupant detection system according to claim 8, wherein the first sensor cell and the second sensor cell are located symmetrically with respect to a center line of the seat.

11. The occupant detection system according to claim 8, wherein the first sensor cell and the second sensor cell are connected in parallel to the controller through the connector.

12. The occupant detection system according to claim 8, wherein the first sensor cell and the second sensor cell are connected in series with the controller.

13. The occupant detection system according to claim 1, wherein the load sensor includes a first film, a first electrode arranged on an inner face of the first film, a second film opposite the first film, a second electrode arranged on an inner face of the second film, and a spacer disposed between the first film and the second film.

14. The occupant detection system according to claim 13, wherein the first film, the second film and the spacer are made of polyethylene naphthalate resin.

15. The occupant detection system according to claim 13, wherein the first electrode includes a first silver layer bonded to the inner face of the first film and a first carbon layer covering a surface of the first silver layer, and the second electrode includes a second silver layer bonded to the inner face of the second film and a second carbon layer covering a surface of the second silver layer.

16. The occupant detection system according to claim 15, wherein the spacer is disposed between the first carbon layer and the second carbon layer.

17. A method of controlling an occupant detection system comprising:
  controlling a capacitance sensor to output a first signal indicating one of an occupant-seated state in which an occupant is seated on a seat, a CRS-mounted state in which a child restraint system is mounted on the seat, and a vacancy state in which the seat is vacant;
  controlling a load sensor to output a second signal indicating one of a load-on-state in which a predetermined load is applied to the load sensor through the seat, and a load-off-state in which the predetermined load is not applied to the load sensor;
  controlling an ON-light indicating airbag inflation allowance for the seat, and an OFF-light indicating airbag inflation prohibition for the seat, based on the first signal and the second signal,
  determining the seat to be in the vacancy state, when the first signal indicates the vacancy state, and when the second signal indicates the load-off-state, and
  determining the seat to be in the CRS-mounted state, when the first signal indicates the vacancy state, and when the second signal indicates the load-on-state, wherein
  the controlling of the ON-light and the OFF-light includes
  turning on the OFF-light, when the seat is determined to be in the CRS-mounted state, and
  turning off both of the ON-light and the OFF-light, when the seat is determined to be in the vacancy state.

18. The controlling method according to claim 17, wherein the controlling of the ON-light and the OFF-light includes turning on the ON-light, when the occupant-seated signal is output, and when the load sensor is ON or OFF, and turning on the OFF-light, when the CRS-mounted signal is output, and when the load sensor is ON or OFF.

* * * * *